US012657144B2

(12) United States Patent
Sarkar et al.

(10) Patent No.: US 12,657,144 B2
(45) Date of Patent: Jun. 16, 2026

(54) METHOD FOR ENABLING AN EFFICIENT DATA PROCESSING IN A DISTRIBUTED NETWORK OF DEVICES

(71) Applicant: ABB Schweiz AG, Baden (CH)

(72) Inventors: Santonu Sarkar, Bangalore (IN);
Marie Christin Platenius-Mohr,
Hirschberg an der Bergstraße (DE);
Madapu Amarlingam, Vikarabad (IN);
Jan Christoph Schlake, Darmstadt
(DE); Reuben Borrison, Brühl (DE)

(73) Assignee: ABB Schweiz AG, Baden (CH)

( * ) Notice: Subject to any disclaimer, the term of this
patent is extended or adjusted under 35
U.S.C. 154(b) by 97 days.

(21) Appl. No.: 18/598,067

(22) Filed: Mar. 7, 2024

(65) Prior Publication Data

US 2024/0303208 A1      Sep. 12, 2024

(30) Foreign Application Priority Data

Mar. 9, 2023    (EP) .................................... 23160986

(51) Int. Cl.
G06F 11/34          (2006.01)
G06F 13/362          (2006.01)
(52) U.S. Cl.
CPC ................................. G06F 13/362 (2013.01)
(58) Field of Classification Search
None
See application file for complete search history.

(56) References Cited

U.S. PATENT DOCUMENTS

| | | | | |
|---|---|---|---|---|
| 4,817,037 | A * | 3/1989 | Hoffman ............... | G06F 13/362 |
| | | | | 710/110 |
| 6,397,212 | B1 * | 5/2002 | Biffar .................. | G06F 16/9538 |
| | | | | 707/999.005 |
| 11,323,544 | B2 | 5/2022 | Evans et al. | |
| 11,372,794 | B2 * | 6/2022 | Ahn ..................... | G06F 13/4031 |
| 12,267,534 | B2 * | 4/2025 | Bheemarasetty .. | H04N 21/4662 |
| 2006/0117151 | A1 * | 6/2006 | Kuroki ................... | G11C 29/08 |
| | | | | 711/148 |
| 2014/0337827 | A1 * | 11/2014 | Addala ................... | E21B 47/12 |
| | | | | 717/171 |

(Continued)

FOREIGN PATENT DOCUMENTS

CN          115668084 A      1/2023

OTHER PUBLICATIONS

European Patent Office, Extended European Search Report in
European Patent Application No. 23160986.8, 8 pp. (Sep. 1, 2023).

*Primary Examiner* — Hyun Nam
(74) *Attorney, Agent, or Firm* — Fitch Even Tabin &
Flannery LLP

(57)          ABSTRACT
A system and method for enabling an efficient data process-
ing in a distributed network of devices includes collecting
first data from at least one client device sent by at least one
plant device via a first communication interface; storing the
first data in a data storage; profiling the first data to obtain
characteristic information of the collected first data; deter-
mining a data processing strategy upon a result of the
characteristic information of the first data; processing the
first data according to the data processing strategy and
deciding which data of the first data need to be sent to the
master device via a second communication interface.

16 Claims, 2 Drawing Sheets

(56)                References Cited

U.S. PATENT DOCUMENTS

| | | | |
|---|---|---|---|
| 2015/0236907 A1* | 8/2015 | Popli | H04L 43/0817 |
| | | | 709/226 |
| 2017/0187696 A1 | 6/2017 | Ahuja et al. | |
| 2017/0353908 A1* | 12/2017 | Sung | H04L 41/0803 |
| 2022/0108262 A1* | 4/2022 | Cella | G05B 17/02 |
| 2022/0164260 A1* | 5/2022 | Krishna | H04L 67/14 |
| 2022/0171689 A1* | 6/2022 | Barnsteiner | H04L 41/5009 |
| 2022/0231952 A1 | 7/2022 | Barton et al. | |
| 2024/0303208 A1* | 9/2024 | Sarkar | H04L 67/12 |
| 2025/0225466 A1* | 7/2025 | Wellmann | G06Q 30/0204 |

* cited by examiner

METHOD FOR ENABLING AN EFFICIENT DATA PROCESSING IN A DISTRIBUTED NETWORK OF DEVICES

CROSS-REFERENCE TO RELATED APPLICATIONS

The instant application claims priority to European Patent Application No. 23160986.8, filed Mar. 9, 2023, which is incorporated herein in its entirety by reference.

FIELD OF THE DISCLOSURE

The present disclosure relates to method for enabling an efficient data processing in a distributed network of devices.

BACKGROUND OF THE INVENTION

As industrial process automation across various industries, such as the energy sector, mining, manufacturing, utility sector, etc., gear towards Industry 4.0 to optimize a production process and production cycle, it is becoming essential to gain insights into the relevant process and equipment conditions.

An industrial production process is established by various devices that are connected to each other to exchange different types and a large amount of data. U.S. Pat. No. 11,323,544 or U.S. Patent Application Pub. No. 2022/0231952 describe examples in the prior art how data can be exchanged in a network of devices.

The massive amount of data in an industrial process from a large number of field or plant devices makes it necessary to deploy a hierarchy of so-called edge devices to a master device to handle the data efficiently for real-time analytics without violating data security constraints. However, the data availability in such an industrial process can be severely impacted when the communication among the devices in a network of distributed devices for an industrial process is interrupted due to a failure. As long as the failure exists, a huge amount of backlog data is generated by the various devices in such a network that needs to be processed after recovery of the failure. Therefore effective strategies have to be implemented how to process the amount of data in case of a failure in a network of devices for an industrial process.

Another challenge in an industrial process is usually the presence of many different or heterogeneous data types generated from different devices that need to be handled by each of the devices participating in such a network of an industrial process. In particular, when data handling is based on machine learning modelling, the number of machine models to be managed in each of the devices can increase significantly. As each of the machine models needs to be trained, evaluated, deployed and monitored, the costs of data handling can easily increase, generating a high model management overhead.

BRIEF SUMMARY OF THE INVENTION

The present disclosure describes an improved system and method for enabling an efficient data processing in a distributed network of devices, especially in case of huge data transmission backlogs. Data processing in the context of the present disclosure may apply to an efficient data exchange in a network of distributed devices or to implement strategies how to react effectively in certain situations, e.g., a loss of data during operation of the devices.

In a first aspect of the present disclosure, there is provided a method for enabling an efficient data processing in a distributed network of devices, comprising the following steps: collecting first data from at least one client device sent by at least one plant device via a first communication interface; storing the first data in a data storage of the at least one client device; profiling the first data to obtain characteristic information of the collected first data; determining a data processing strategy upon a result of the characteristic information of the first data; processing the first data according to the data processing strategy and decide which data of the first data need to be sent to the master device via a second communication interface.

In embodiments of the present disclosure, the data that is received from at least one client device sent by a plant device is analysed to first determine a data strategy of how the data is processed upon the data characterization before the data is transmitted to another device, e.g., at least one master device, a further or second client device, a cloud, in the network of distributed devices.

The distributed network or the system or platform comprises a number of client devices that are connected to other client devices and to at least one master devices, e.g., in a hierarchical manner. The master device or higher-edge device usually executes a data-intensive data handling program, e.g., machine learning. The at least one client device or the lower-edge device usually collects data from a plant device that senses various types of data, e.g., temperature data, speed data. A data-type related strategy that can be embodied in form of a file determines which data is send in which manner. In this way, the present disclosure provides multiple data transfer strategies based on different types of data demand or based on changing requirements in the network or application.

BRIEF DESCRIPTION OF THE SEVERAL VIEWS OF THE DRAWING(S)

Exemplary embodiments will be described in the following with reference to the following drawings.

DETAILED DESCRIPTION OF THE INVENTION

Figures 1, 2:
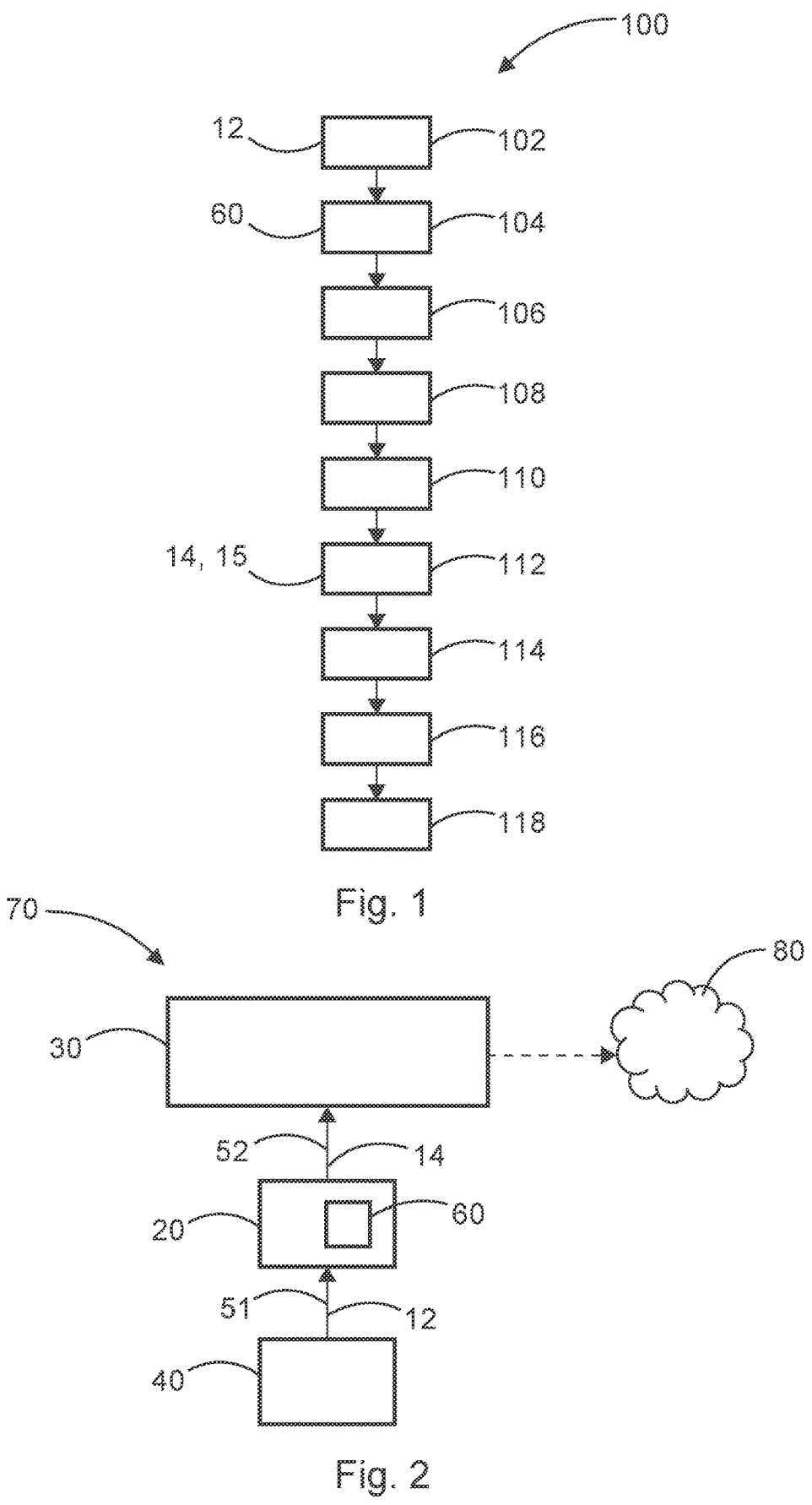
FIG. 1 is a flowchart for a method in accordance with the present disclosure.
FIG. 2 is a block diagram of an exemplary embodiment of a network of distributed devices exchanging data according to a method of the present disclosure.

FIG. 1 illustrates a schematic flow-diagram of a method 100 of the present disclosure. In a first step 102, first data 12 is collected from at least one client device 20 sent by at least one plant device 40 via a first communication interface 51. In a second step 104, the first data 12 is stored in a data storage 60 of the at least one client device 20. In a third step 106, the first data 12 is profiled to obtain characteristic information of the collected first data 12. In a fourth step 108, a data processing strategy upon a result of the characteristic information of the first data 12 is determined. The characteristic information of the first data 12 may include at least one of type of data, statistical information, data distribution property, static, stationarity of data or dynamical data.

The transmission format in the data aggregation may be based on at least one aggregation rule that has been determined by the master device 30 in advance and provided to the at least one client device 20.

In a fifth step 110, the first data 12 is processed according to the data processing strategy and decide which data of the first data 12 need to be sent 118 to the master device 30 via a second communication interface 52. The data processing strategy is at least one of data aggregation, data compressing, data selecting, data resampling, data imputation, data augmentation or data raw data processing.

The at least one type of first data 12 is one of at least, raw data, hot data, warm data or cold data which indicates a relevance of the first data 12 to be sent from the client device 20 to the master device 30. Further, the first data 12 may be time-series data or telemetry data.

Optionally, the step 108 of determining the data processing strategy comprises the step of determining 112 an aggregation parameter 15 of the first data 12 that influences a strategy in the at least one client device 20 about how the first data 12 need to be aggregated.

Optionally, when it is decided according to the aggregation parameter 15 to aggregate the first data 12, perform the step 114 of data aggregation of at least a part of the first data 12 to obtain second data 14 based on the data processing strategy of the first data (12), wherein the data aggregation comprises further the step of determining 116 a transmission format corresponding to the type of data of the second data 14 in order to decide, which of the second data 14 needs to be sent to the master device 30 by the at least one client device 20. In this context, it should be mentioned that not all data of the first data might to be aggregated.

FIG. 2 illustrates a schematic example of a distributed network 70 exchanging data according to a method of the present disclosure. The distributed network 70 may be established in a hierarchical manner or in a peer-two-peer manner between the master device 30 and the at least one client device 20. The client device 20 is connected via a first communication interface 51 to a plant device 40 that senses or processes sensed data, e.g., a temperature value, a speed value, as first data 12.

The first data 12 may be stored in a data storage 60 of the client device 20 for a further data processing, such as a data profiling to obtain characteristic information of the collected first data or determining a corresponding data processing strategy.

The first data 12 is then processed according to a determined data processing strategy to the master device 30 via a second communication interface 52. For example, one data processing strategy for the first data 12 could be data aggregation of at least a part of the first data 12 to obtain second data 14. The data aggregation comprises further the step of determining a transmission format corresponding to the type of data of the second data 14 in order to decide, which of the second data 14 needs to be sent to the master device 30 by the at least one client device 20.

The master device 30 can optionally be connected to an external data center 80, e.g., a cloud, for exchanging the data to further proceed the received second data 14. The master device 30 processes the received second data 14, e.g., by a further aggregation or performing data analyzing.

The determination of an adequate data processing strategy is implemented in the client device 20 in this embodiment. However, it might be possible that the rules for generating a basic data processing strategy might also be generated in the global master device and then be distributed from the master device to the plurality of client devices 20 for a client device-based adaption of the received basic data processing strategy.

It should be noted that the flow of data in the FIG. 2 may be one-way from the client device 20 to the master device 30. However, a data transfer from the master device 30 to the client device 20 is also possible depending on the application.

In the network 70, the master device 30 may be on a higher hierarchical level than the client device. However, the present disclosure can be applied to multiple client device topologies. The following gives some examples of possible client device topologies:

Hierarchical topology, strict security, less powerful client devices: The client device can send raw data to the master device which stores or aggregates the raw data to an external data center, e.g., a cloud.

Hierarchical topology, strict security, powerful client devices can aggregate data and send aggregated data to the master device, which can then send it to an external data center, e.g., a cloud.

Distributed client devices with a direct connection to a cloud: A set of client devices can perform aggregations and then send them directly to a cloud.

In regard of a customized data aggregation, the following examples are provided:

The system allows various aggregation rules based on window-based aggregation with different window sizes.

The system allows configurable rules to aggregate data that are not older than a certain time-period.

Powerful client device: Auto-encoding of data at the client-device to reduce data size. Decoding can happen at the master device if it requires latest, non-aggregated data for computation.

Less Powerful client device: Auto encoding can happen on the master device. Decoding can happen on the cloud.

The handling of data Variety or data clustering for an optimal number of models according to the present disclosure can be performed in various ways:

Cohort (or grouping) the data from different client devices based on asset (=device) type (using asset taxonomy), similarity of data distributions (coming from different assets).

The clustering can be done on i) client devices, where the master device can coordinate this activity or ii) at the central location master device depending on the business scenario. The purpose of grouping is to get the data that captures all relevant scenarios (variety) and enough data for each relevant scenario (volume), which helps in training robust ML models and improve the model generalization performance.

For grouping or cohorting the data from different assets statistical difference between two data sets can be used. For example, Kullback-Leibler (KL) divergence is one approach that can be used to determine the statistical difference between the data from two assets. On top of statistical difference values, we use clustering algorithms such as K-means or hierarchical clustering for grouping the clients based on data.

The entire functionality of grouping or cohorting can be implemented in the "Data cohorting" module at the master device.

The master devices may learn uncertainty levels coming from client devices (one might predict better than another) and use it for aggregation and display it with the results. The client devices may aggregate data differently to provide different quality level data to higher edge. For a Machine Learning application in the higher edge this could for example mean to generate more than one central model, e.g., distinguish between different applications, client devices/related assets by the weights they send for aggregation to the master device.

Figure 3:
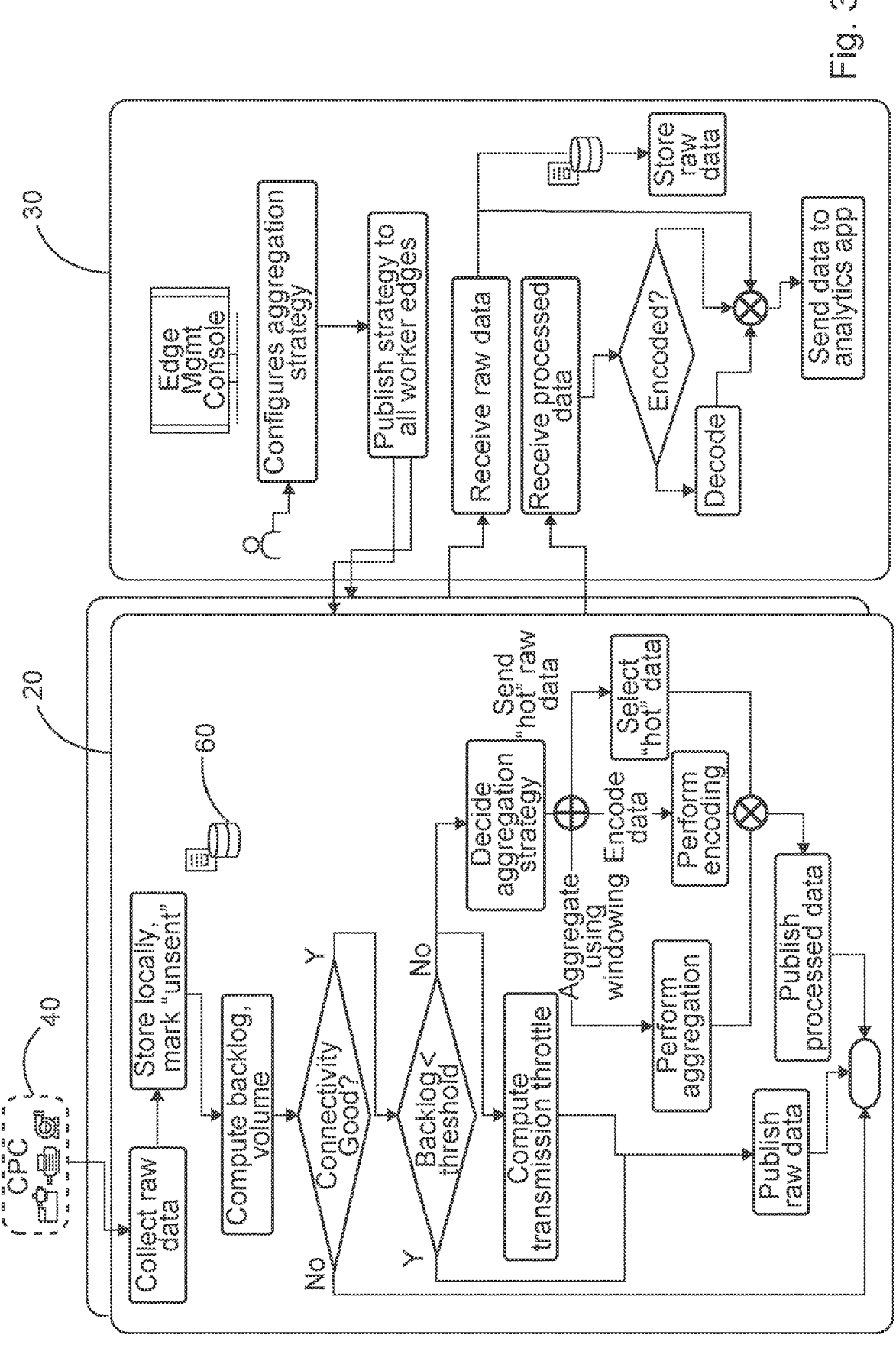
FIG. 3 is a schematic flow-diagram of data processing between a master device and a client device according to an embodiment of the present disclosure.

FIG. 3 illustrates a schematic flow-diagram of data processing between a master device 30 and a client 20 device according to an embodiment of the present disclosure.

A data collection-and-transmission module of the client device 20 is responsible for collecting raw data from a Core Process Control domain (=CPC domain) or a client device 40 which is considered as the same in this figure and send it to the master device 20. The CPC is where the current and well-protected process control is implemented. It contains deterministic control systems with high availability and reliability. It will be called the "Core Process Control" domain (abbreviated CPC). The core process control domain (=CPC domain) is responsible for the reliable and deterministic operation of the plant. These systems run in a deterministic way and the communication between the components within the CPC domain is mostly based on proprietary interfaces.

The data collection module stores the data in the local database 60, e.g., with a timestamp, and marks the received data (=first data) as unsent. The transmission module in parallel, sends the stored, and "unsent" data, e.g., in first in, first out manner, under normal circumstances to the master device 30. The client device 20 also has a kind of a watchdog component that detects whether the connectivity to the master device 30 is lost. If so, the transmission module stops sending any data and waits for the watchdog to provide a transmission recovery signal.

The data storage 60 of the client device 20 keeps storing the data in the local data-store as long as the client device 20 has the storage capacity to hold the incoming data. If the storage capacity is empty or the data storage 60 is completely occupied with data, the data store module discards data using one of the two strategies:

Discard old data: It flushes out old (telemetry) data and stores the new incoming data.

Discard new data: It does not accept any new data from CPC.

The data forward module of the client device 20 then transmits the data in FIFO manner as long as the backlog is within a defined threshold. If the threshold exceeds by a great margin, it assumes that there has been an outage and enables a determined aggregation strategy to fulfil the data demand. If there is no explicit demand, then it continues to send the data to the master device 30 in FIFO manner. If the data availability requirement indicates that the master device requires live data or hot data, then the type of data is immediately sent after recovery of the failure to the master device.

The data transmission between client device and master device according to the present disclosure can be as following:

The client device or worker edge device is configured to push the data backlog to the master device or upper edge device from the last successful data transmission. The push algorithm considers the volume of backlog and based on the configuration, can take one or more of the following strategies.

Bandwidth throttling: The client device applies an upper bound on the network bandwidth consumption and adjusts transmission speed of the backlog data.

Latest data first: The client device can send the latest chunk (configurable) of data first.

A data processing strategy in the context of the present disclosure could mean to handle the first data before sending to the master device with at least one of grouping, compressing or selecting type and/or a selecting an amount of stored first data in a data storage of a device, e.g., client, master, cloud.

At the client devices or lower edge devices data is defined according to its availability for other devices in the network classified in categories such as hot data, warm data, cold data or cloud data.

Hot data or live data means that the latest data must be given as soon as possible when the edge or network infrastructure connectivity is recovered from a failure. Application requires unprocessed, live telemetry data during training or during operation. Examples may be data having high fluctuations, data for real time monitoring, prediction and actions. Hot data are data with an extremely high data availability requirement.

Warm data means that applications need the latest data but at a low or medium priority, after connectivity restoration. Applications do not require new data or data is not generated very frequently. Data collected after a long interval is sufficient. Warm data can be used for complex measurements such as misalignment, time-frequency domain conversion, resonance analysis, narrow band envelope analysis, etc. Warm data can be used for retraining a machine learning model. Typical applications can be periodic health monitoring or prediction.

Cold or offline data means that there is no need to get the latest data in the immediate future. Applications require a mix of warm and historical data to build robust machine learning models from scratch or perform periodic retraining if the model performance is unsatisfactory.

Depending on this type of data, data is either send and/or stored in the at least one client device or any other storage device connected to the device. Sending data is effected by some decisions regarding data loss meaning how to deal with missing data, data compression meaning if there is a need to compress data and in which manner. In this way, an effective data handling in case of large amounts of data and the existence of different types of data can be easily applied and adapted to changing requirements in the application or network. A further advantage is that data handling including data transmission in such a network can be easily prioritized.

A further advantage of the present disclosure is that a cohorting-based data clustering can be performed in an effective manner reducing the number of machine learning models in the devices of the network.

A further advantage of the present disclosure is that data availability in the network can be handled efficiently in the event of a failure and the subsequent recovery as both data velocity and data veracity are taken into account while achieving real-time availability of latest data specifically when the bandwidth is not sufficient.

A further advantage of the present disclosure is that if an analytics application can accommodate processed or aggregated data, the solution offers a flexible aggregation logic to send aggregated data rather than raw data to the enquiring devices in the network. This approach can provide the latest hot data quickly, when there is a backlog of telemetry data in a client device due to a communication failure. If the application needs hot raw data, the solution uses e.g., auto encoding to transmit latest data which are collected from the client device to the master device (or to the cloud) quickly.

A further advantage of the present disclosure is the ease of management of machine learning (ML) model reducing a data variety in the network. The approach of the present disclosure performs cohorting of data which in turn reduces the number of models. The approach uses a predefined asset taxonomy to cohort data.

Another advantage of the present disclosure is that data quality is improved. By using a flexible decoding, when auto-encoder is used to encode, the data can be performed anywhere, e.g., master device or in the cloud. Decoding can also detect anomaly in the data, if decoding fails.

According to an example, the characteristic information of the first data includes at least one of type of data, statistical information, data distribution property, and static or dynamical data. Therein, the advantage is achieved that a data-type related strategy of handling the first data can be better adopted to the existing type of data resulting in a more efficient data handling process.

According to an example, the at least one type of first data is one of at least, raw data, hot data, warm data or cold data which indicates a relevance of the first data to be sent from the at least one client device to the master device. Therein, the advantage of an efficient data handling in the network is achieved. Further, a more detailed data processing strategy can be implemented.

According to an example, the first data is time-series data. The advantage achieved is that time-series data or telemetry data is handled in an efficient way when generated in various process industries, e.g., chemical, pulp and paper, cement, water networks, power plants, Food and Beverage processing, oil and gas industry etc.

According to an example, the data processing strategy is at least one of data aggregation, data compressing, data selecting, data resampling, data imputation, data augmentation or raw data processing. Therein, the advantage is achieved that the data processing strategy can be applied to different needs and changing requirements in the network.

According to an example, the step of determining the data processing strategy comprises the step of determining an aggregation parameter of the first data that influences a strategy in the at least one client device about how the first data need to be aggregated. Therein, the advantage of a more efficient data processing in the network is achieved. It should be noted that the aggregation parameter may be an amount of accumulated backlog and unsent first data by the at least one client device to the master device in case of a communication failure until recovery of the communication failure.

According to an example, when it is decided according to the aggregation parameter to aggregate the first data, perform data aggregation of at least a part of the first data to obtain second data based on the data processing strategy of the first data, wherein the data aggregation comprises further the step of determining a transmission format corresponding to the type of data of the second data in order to decide, which of the second data needs to be sent to the master device by the at least one client device. Therein, the advantage of a more efficient data processing in the network is achieved.

A transmission format for first data could be for example be grouped, aggregated, zipped, uncompressed, raw data etc.

According to an example, the transmission format in the data aggregation is based on at least one aggregation rule that has been determined by the master device in advance and provided to the at least one client device. In this way, the advantage of a data aggregation method can be easily and in an efficient manner provided to a plurality of client devices saving data transmission costs.

Therein, the advantage is achieved that the distributed network is established in a hierarchical manner or in a peer-two-peer manner between the master device and the at least one client device. In this way, the advantage of an efficient data processing can be easily implemented according to the requirements of the network.

In a second aspect of the present disclosure, a computer is provided comprising a processor configured to perform the method of the preceding aspect.

In a third aspect of the present disclosure, there is provided a computer program product comprising instructions which, when the program is executed by a processor of a computer, causes the computer to perform the method of any of the first and second aspects.

In a fourth aspect of the present disclosure, a machine-readable data medium and/or download product containing the computer program of the third aspect.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE SIGNS

100 Method
102 Collecting

104 Storing
106 Profiling
108 determining
110 Processing
112 Determining
114 Performing
116 Determining
118 Sending
12 First data
14 Second data
15 Aggregation parameter
20 Client device (Recipient)
30 Master device (Sender)
40 Plant device/CPC
50 First communication interface
52 Second communication interface
60 Data storage
70 Distributed network
80 External data center

What is claimed is:

1. A method for enabling an efficient data processing in a distributed network of devices, comprising:

collecting first data from at least one client device sent by at least one plant device via a first communication interface;

storing the first data in a data storage of the at least one client device;

profiling the first data to obtain characteristic information of the collected first data;

determining a data processing strategy upon a result of the characteristic information of the first data;

processing the first data by aggregating at least a part of the first data to obtain a second data according to the data processing strategy and deciding which data of the second data need to be sent to a master device via a second communication interface, determining a transmission format corresponding to the type of data of the second data to be sent to the master device by the at least one client device, wherein the transmission format is based on at least one aggregation rule determined by the master device and provided to the at least one client device.

2. The method according to claim 1, wherein the characteristic information of the first data includes at least one of type of data, statistical information, data distribution property, static or dynamical data.

3. The method according to claim 2, wherein the at least one type of first data is one of at least, raw data, hot data, warm data or cold data which indicates a relevance of the first data to be sent from the client device to the master device.

4. The method according to claim 1, wherein the first data is time-series data.

5. The method according to claim 1, wherein the data processing strategy is at least one of data aggregation, data compressing, data selecting, data resampling, data imputation, data augmentation or data raw data processing.

6. The method according to claim 1, wherein the step of determining the data processing strategy comprises the step of determining an aggregation parameter of the first data that influences a strategy in the at least one client device about how the first data need to be aggregated.

7. The method according to claim 6, wherein it is decided according to the aggregation parameter to aggregate the first data.

8. The method according to claim 1, wherein the distributed network is established in a hierarchical manner or in a peer-two-peer manner between the master device and the at least one client device.

9. A computer program product comprising instructions stored on non-transient tangible media which, when the computer program is executed by a processor of a computer, causes the computer to perform a method for enabling an efficient data processing in a distributed network of devices, comprising:

instructions for collecting first data from at least one client device sent by at least one plant device via a first communication interface;

instructions for storing the first data in a data storage of the at least one client device;

instructions for profiling the first data to obtain characteristic information of the collected first data;

instructions for determining a data processing strategy upon a result of the characteristic information of the first data;

instructions for processing the first data by aggregating at least a part of the first data to obtain a second data according to the data processing strategy and instructions for deciding which data of the second data need to be sent to a master device via a second communication interface, determining a transmission format corresponding to the type of data of the second data to be sent to the master device by the at least one client device, wherein the transmission format is based on at least one aggregation rule determined by the master device and provided to the at least one client device.

10. The computer program according to claim 9, wherein the characteristic information of the first data includes at least one of type of data, statistical information, data distribution property, static or dynamical data.

11. The computer program according to claim 10, wherein the at least one type of first data is one of at least, raw data, hot data, warm data or cold data which indicates a relevance of the first data to be sent from the client device to the master device.

12. The computer program according to claim 9, wherein the first data is time-series data.

13. The computer program according to claim 9, wherein the data processing strategy is at least one of data aggregation, data compressing, data selecting, data resampling, data imputation, data augmentation or data raw data processing.

14. The computer program according to claim 9, wherein the instructions for determining the data processing strategy comprises instructions for determining an aggregation parameter of the first data that influences a strategy in the at least one client device about how the first data need to be aggregated.

15. The computer program according to claim 14, wherein it is decided according to the aggregation parameter to aggregate the first data.

16. The computer program according to claim 9, wherein the distributed network is established in a hierarchical manner or in a peer-two-peer manner between the master device and the at least one client device.

* * * * *